(12) United States Patent
Kim (10) Patent No.: US 10,741,821 B2
(45) Date of Patent: Aug. 11, 2020

(54) SECONDARY BATTERY

(71) Applicant: SAMSUNG SDI CO., LTD., Yongin-si, Gyeonggi-do (KR)

(72) Inventor: Dae Kyu Kim, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 712 days.

(21) Appl. No.: 15/391,881

(22) Filed: Dec. 28, 2016

(65) Prior Publication Data

US 2017/0194620 A1 Jul. 6, 2017

(30) Foreign Application Priority Data

Jan. 6, 2016 (KR) ........................ 10-2016-0001559

(51) Int. Cl.
*H01M 2/34* (2006.01)
*H01M 2/12* (2006.01)

(52) U.S. Cl.
CPC ......... *H01M 2/345* (2013.01); *H01M 2/1241* (2013.01); *H01M 2200/20* (2013.01)

(58) Field of Classification Search
CPC .................................................. H01M 2/345
See application file for complete search history.

(56) References Cited

U.S. PATENT DOCUMENTS

| | | | | |
|---|---|---|---|---|
| 5,707,756 A * | 1/1998 | Inoue | ................... | H01M 2/1235 429/57 |
| 6,555,263 B1 * | 4/2003 | Kim | ................... | H01M 2/1241 429/53 |
| 2005/0214634 A1 * | 9/2005 | Kim | ................... | H01M 2/0413 429/53 |
| 2009/0098445 A1 * | 4/2009 | Kim | ................... | H01M 2/0413 429/72 |
| 2009/0233157 A1 * | 9/2009 | Kim | ................... | H01M 2/0413 429/53 |
| 2010/0015508 A1 * | 1/2010 | Hwang | ............... | H01M 2/0426 429/56 |
| 2015/0147600 A1 * | 5/2015 | Tsuruta | ................. | H01M 2/345 429/7 |

FOREIGN PATENT DOCUMENTS

| | | |
|---|---|---|
| JP | 09-120811 A | 5/1997 |
| JP | 10-284037 A | 10/1998 |

* cited by examiner

*Primary Examiner* — Barbara L Gilliam
*Assistant Examiner* — Nathanael T Zemui
(74) *Attorney, Agent, or Firm* — Lee IP Law, P.C.

(57) ABSTRACT

A secondary battery includes an electrode assembly, a cap assembly, and a case. The electrode assembly includes a separator between a first electrode and a second electrode. The cap assembly is electrically connected to the first electrode. The case accommodates the electrode assembly and includes an opening to which the cap assembly is coupled. The cap assembly includes a cap and a current interruptor. The cap is outside the case and serves as a terminal of the first electrode. The current interruptor is between the cap and the first electrode. The current interruptor breaks an electric connection between the cap and the first electrode at a preset pressure or higher. The cap surrounds an edge portion of the current interruptor.

17 Claims, 9 Drawing Sheets

FIG. 12

SECONDARY BATTERY

CROSS-REFERENCE TO RELATED APPLICATION

Korean Patent Application No. 10-2016-0001559, filed on Jan. 6, 2016, and entitled, "Secondary Battery," is incorporated by reference herein in its entirety.

BACKGROUND

1. Field

One or more embodiments described herein relate to a secondary battery.

2. Description of the Related Art

A secondary battery may be used as a renewable energy source because of its ability to be recharged. A secondary battery may include a plurality of unit cells connected in series and/or parallel. A controller may be included to control charging and/or discharging operations and prevent overcharge and/or overdischarge conditions.

SUMMARY

In accordance with one or more embodiments, a secondary battery includes an electrode assembly includes a separator between a first electrode and a second electrode; a cap assembly electrically connected to the first electrode; and a case accommodating the electrode assembly and including an opening to which the cap assembly is coupled, wherein the cap assembly includes: a cap outside the case and serving as a terminal of the first electrode; and a current interruptor between the cap and first electrode, the current interruptor to break an electric connection between the cap and first electrode at a preset pressure or higher, the cap surrounding an edge portion of the current interruptor.

The case may include a clamping portion bent toward the cap assembly, and the cap may have a height equal to or less than a height of the clamping portion. The cap may have a reduced thickness to allow the cap to fracture at a preset pressure or higher. An exposed surface of the cap may include a groove with a circular ring shape, and the thickness of the cap may be reduced in a region including the groove. A portion of the cap surrounded by the groove may have a height equal to or greater than a height of a portion of the cap outside the groove and is equal to or lower than a height of a clamping portion of the case.

The current interruptor may include a first plate contacting the cap and a second plate contacting the first plate, wherein the first electrode of the electrode assembly is electrically connected to the cap via the second plate, and wherein the first plate is separated from the second plate at the preset pressure or greater.

In accordance with one or more other embodiments, a secondary battery includes an electrode assembly includes a separator between a first electrode and a second electrode; a cap assembly electrically connected to the first electrode; and a case accommodating the electrode assembly and including an opening to which the cap assembly is coupled, wherein the cap assembly includes: a cap exposed outside the case; and a first plate contacting the cap, wherein the first plate is to deform at a preset pressure or greater to break an electric connection between the cap and the first electrode of the electrode assembly, and the cap surrounds an edge portion of the first plate.

The first plate may include a bead protruding toward the cap and contacting the cap. The cap may include a protrusion; and a circumference portion extending radially outward from the protrusion and having a height less than a height of the protrusion, wherein the bead is in contact with the circumference portion. The case may include a clamping portion bent toward the cap assembly, and the height of the protrusion of the cap may be equal to or less than a height of the clamping portion.

The cap may include a groove between the protrusion and the circumference portion. The cap may include a flat exposed surface; and a groove in the flat exposed surface of the cap. The secondary battery may include an insulator between an edge portion of the first plate and the cap.

The cap assembly may include a second plate between the first plate and the first electrode of the electrode assembly, and the first plate may partially protrude toward the second plate and contacts the second plate, the first plate to deform and separate from the second plate at the preset pressure or greater. The insulator may extend between the first plate and the second plate, and at least an edge portion of the second plate may be spaced from the first plate. The cap may be spaced from the second plate.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will be described with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments, or certain aspects thereof, may be combined to form additional embodiments.

In the drawings, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

When an element is referred to as being "connected" or "coupled" to another element, it can be directly connected or coupled to the another element or be indirectly connected or coupled to the another element with one or more intervening elements therebetween. In addition, when an element is referred to as "including" a component, this indicates that the element may further include another component instead of excluding another component unless there is different disclosure. In the present disclosure, the term "secondary battery" may refer to any type of rechargeable battery.

Figure 1:
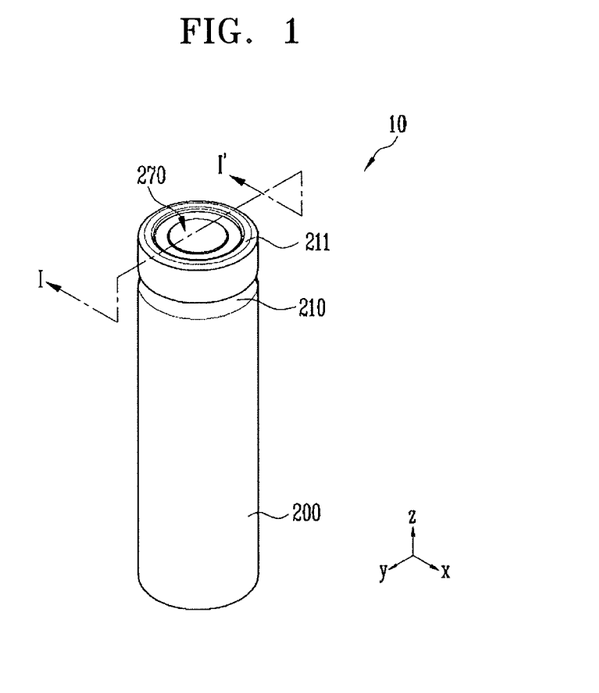
FIG. 1 illustrates an embodiment of a secondary battery.
Figure 2:
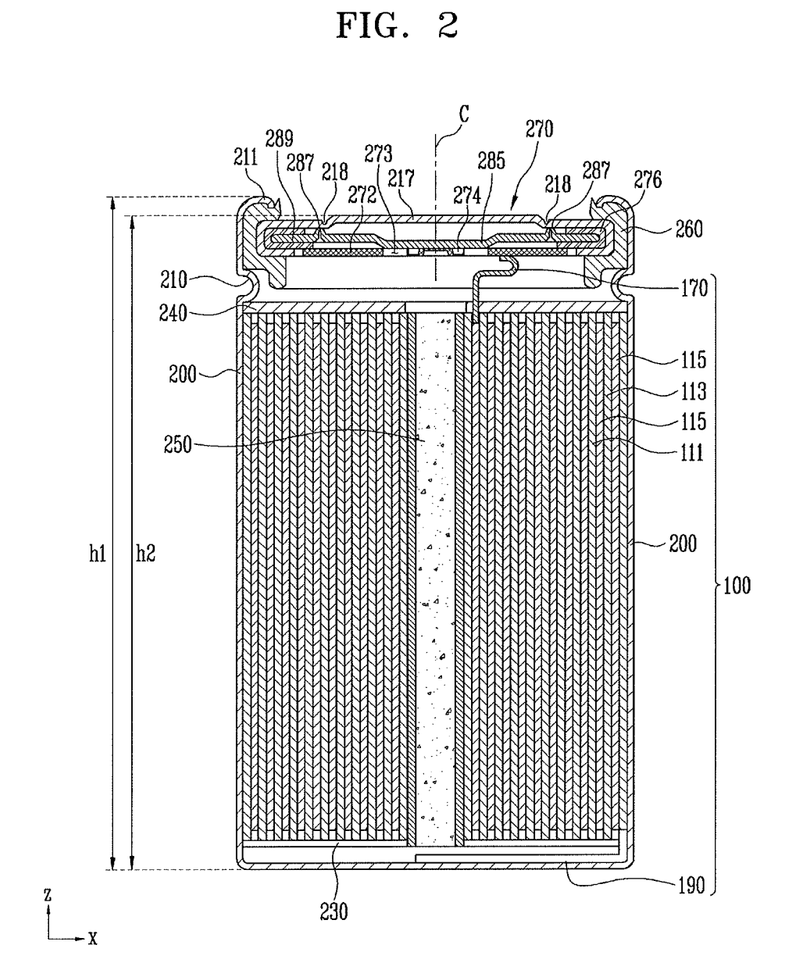
FIG. 2 illustrates a view along section line I-I' in FIG. 1.
Figure 3:
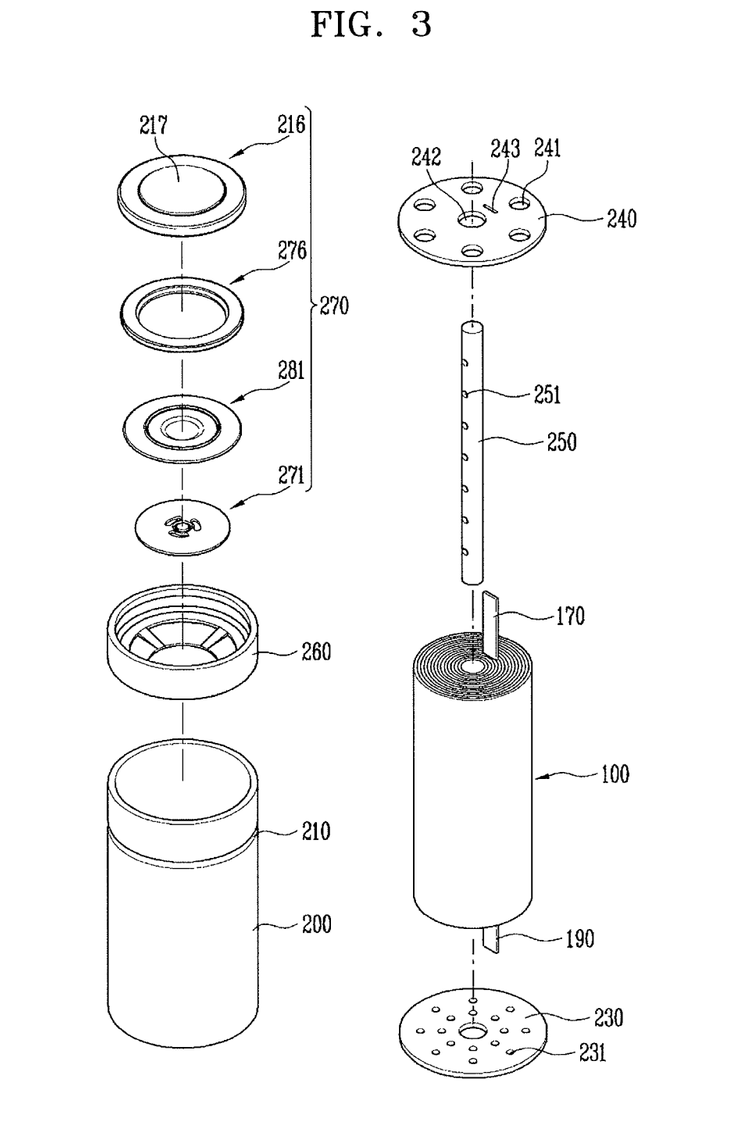
FIG. 3 illustrates another view of the secondary battery in FIG. 1.

FIG. 1 illustrates an embodiment of a secondary battery 10. FIG. 2 is a cross-sectional view taken along line I-I' of the secondary battery 10 in FIG. 1. FIG. 3 is an exploded perspective view illustrating the secondary battery 10.

Referring to FIGS. 1, 2, and 3, the secondary battery 10 includes an electrode assembly 100, a plurality of insulation plate 230 and 240, a center pin 250, a case 200 accommodating the electrode assembly 100, a cap assembly 270 coupled to an opening of the case 200, and a gasket 260 sealing the opening of the case 200 together with the cap assembly 270.

The electrode assembly 100 includes a separator 115 between a first electrode 113 and a second electrode 111. The first and second electrodes 113 and 111 have different polarities. One of the first or second electrodes 113 and 111 is a positive electrode and the other is a negative electrode. The first electrode 113, the separator 115, and the second electrode 111 are sequentially stacked and wound.

The electrode assembly 100 includes a first electrode tab 170 electrically connected to the first electrode 113 and a second electrode tab 190 electrically connected to the second electrode 111. Energy generated by the electrode assembly 100 is transferred to an external device through the first and second electrode tabs 170 and 190. The first and second electrode tabs 170 and 190 include a conductive material such as nickel (Ni) or a nickel alloy.

The first electrode tab 170 is fixed to a second plate 271, e.g., may be welded to the second plate 271. The first electrode 113 is electrically connected to the cap assembly 270 via the first electrode tab 170.

The first electrode tab 170 is connected to a non-coated portion of the first electrode 113 and extends to the outside of the electrode assembly 100 which is wound. The first electrode 113 may be formed by partially coating a sheet-shaped current collector with an active material, and the non-coated portion of the first electrode 113 is a portion not coated with the active material. The second electrode tab 190 is connected to a non-coated portion of the second electrode 111 and extends to the outside of the electrode assembly 100 which is wound. The second electrode 111 is formed by partially coating a sheet-shaped current collector with an active material. The non-coated portion of the second electrode 111 is a portion not coated with the active material.

Each of the current collector of the first electrode 113 and the current collector of the second electrode 111 may be, for example, metal foil including at least one of stainless steel, nickel, copper, aluminum, or alloys thereof.

When the first electrode 113 is a positive electrode and the second electrode 111 is a negative electrode, the active material of the first electrode 113 may include a positive electrode active material. The positive electrode active material may include a lithium-containing oxide or another type of positive electrode active material. The active material of the second electrode 111 may include a negative electrode active material. The negative electrode active material may include at least one of carbon, graphite, silicon, or another type of negative electrode active material.

In one embodiment, the first electrode 113 may be a negative electrode and the second electrode 111 may be a positive electrode. In this case, the current collector of the first electrode 113 may be coated with a negative electrode active material and the current collector of the second electrode 111 may be coated with a positive electrode active material.

The case 200 may be a cylindrical barrel with an opening in an end thereof and a space for accommodating the electrode assembly 100. The second electrode tab 190 may be welded to a bottom surface of the case 200. Thus, the case 200 may function as a terminal of the second electrode 111. The case 200 may include stainless steel, aluminum, or another material.

The insulation plates 230 and 240 includes a first insulation plate 240 in a region in which the electrode assembly 100 faces the opening of the case 200, and a second insulation plate 230 in a region in which the electrode assembly 100 faces a side of the case 200 opposite the opening, e.g., the bottom surface of the case 200. Short circuits between the electrode assembly 100 and the case 200 may be prevented by the first and second insulation plates 240 and 230.

The first insulation plate 240 may include a plurality of holes 241 to allow an electrolyte to easily permeate into the electrode assembly 100. The first insulation plate 240 may include a hole 243 through which passes the first electrode tab 170 extending from the electrode assembly 100. The second insulation plate 230 may include a plurality of holes 231 to reduce the amount of space occupied by the second insulation plate 230. Thus, the amount of electrolyte in the case 200 may be less reduced by the second insulation plate 230.

The center pin 250 is provided along a center axis of the electrode assembly 100 to support the electrode assembly 100 and prevent unwinding of the electrode assembly 100. For example, the center pin 250 may be a hollow circular rod. An end of the center pin 250 may push the second electrode tab 190 against the case 200.

When the center pin 250 is a hollow pin, the center pin 250 may function as a passage for gas generated from the electrode assembly 100. The first insulation plate 240 includes a hole 242 in a center region corresponding to the center pin 250 to discharge gas through the hole 242. The center pin 250 may include a plurality of holes 251 in a lateral side thereof to allow the electrolyte to easily impregnate the electrode assembly 100 and discharge gas generated from the electrode assembly 100.

A clamping portion 211 bent inward is formed along an edge of the opening of the case 200. The clamping portion 211 pushes the cap assembly 270 and increases the coupling strength between the cap assembly 270 and the case 200. The case 200 includes an inwardly convex bead 210 in a region between the opening and the electrode assembly 100. The inner diameter of the bead 210 is less than the outer diameter of the electrode assembly 100 to allow the electrode assembly 100 to be fixed in the case 200.

The cap assembly 270 includes a current interrupt device between a cap 216 and the electrode assembly 100. The current interrupt device includes a first plate 281, a second plate 271, and an insulator 276. The cap 216 is electrically connected to the first electrode 113 of the electrode assembly 100 via the current interrupt device. The current interrupt device breaks electric connection between the cap 216 and the first electrode 113 at a preset operation pressure.

The cap 216 may function as a terminal of the first electrode 113 of the electrode assembly 100. The cap 216 may have, for example, a cylindrical barrel shape which opens towards the electrode assembly 100 and has a space for accommodating the current interrupt device. The cap 216 covers an upper portion of the current interrupt device and surrounds an edge portion of the current interrupt device.

The cap 216 includes a conductive material, e.g., aluminum or another material. The cap 216 includes a terminal surface 217 extending in radial directions outward from a center axis C of the secondary battery 10. A cap circumference portion 219 (e.g., refer to FIG. 4) extends from the terminal surface 217 and surrounds the edge portion of the current interrupt device. The cap circumference portion 219 is bent in approximately a U-shape and surrounds an outer edge portion of the current interrupt device. The center axis C of the secondary battery 10 is parallel with a z-axis, which is parallel to the length of the secondary battery 10. The radial directions may be parallel with an x-y plane.

Figure 4:
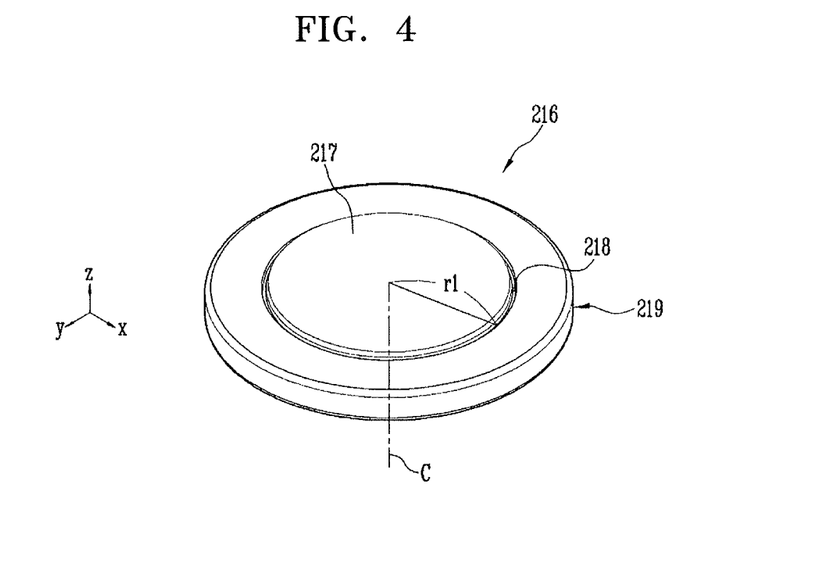
FIG. 4 illustrates an embodiment of a cap.

The terminal surface 217 is extends outside the case 200 and functions as a terminal of the first electrode 113. A groove 218 at which the thickness of the cap 216 is relatively small is formed in the terminal surface 217. The cap 216 fractures along the groove 218 at a preset fracture pressure. The groove 218 may extend, for example, in a circular ring shape with a radius r1. The shape of groove 218 may be different in another embodiment.

A portion of the terminal surface 217 enclosed by the groove 218 is outwardly convex. Thus, a space is between the terminal surface 217 and the current interrupt device. The current interrupt device operates in the space between the terminal surface 217 and the current interrupt device.

The terminal surface 217 is not higher than the clamping portion 211 in the direction of the z-axis, but is higher than the current interrupt device. In the longitudinal direction (z-axis direction) of the secondary battery 10, a first height h1 corresponds to a length measured from the clamping portion 211 to the bottom surface of the case 200. A second height h2 corresponds to a length measured from the terminal surface 217 to the bottom surface of the case 200. A protruding height of the terminal surface 217 is such that the first height h1 is greater than or equal to the second height h2.

Figure 6:
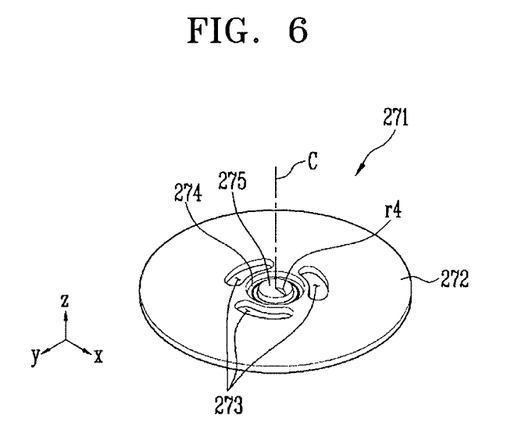
FIG. 6 illustrates an embodiment of a second plate.
Figure 7:
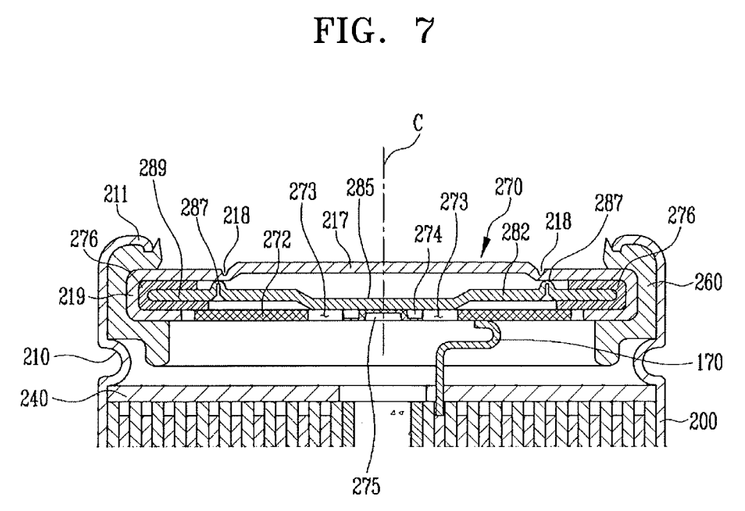
FIG. 7 illustrates an enlarged view of a portion in FIG. 2.

The current interrupt device includes the insulator 276, the first plate 281, and the second plate 271 sequentially stacked in a direction from the cap 216 toward the electrode assembly 100. The second plate 271 is a conductive plate whose lower surface is in contact with the first electrode tab 170. The second plate 271 includes a main body 272 having an approximately circular shape. A groove 274 at which the main body 272 of the second plate 271 has a relatively small thickness is in the main body 272 to cause fracture of the second plate 271 along the groove 274 at a preset operation pressure. The groove 274 may have, for example, a circular ring shape with a radius r4 based on the center axis C.

A plurality of holes 273 are formed in the main body 272 of the second plate 271 in a region outside the groove 274 in a radial direction. The holes 273 may allow gas to be discharged through the holes 273. In addition, the second plate 271 includes a center portion 275 contacting the first plate 281. The center portion 275 of the second plate 271 corresponds to the center axis C and may have a recessed lower surface.

An edge of the second plate 271 is spaced apart from an end of the cap circumference portion 219. The end of the cap circumference portion 219 corresponds to an edge of a portion of the cap 216 opened toward the electrode assembly 100.

Figure 5:
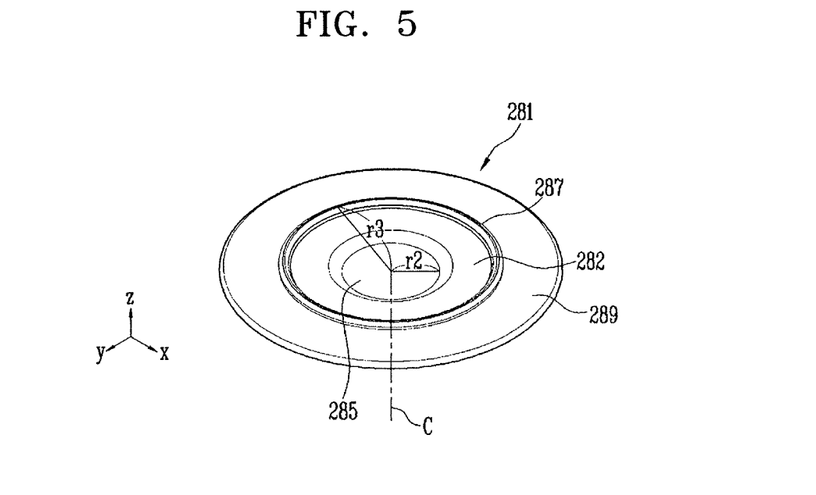
FIG. 5 illustrates an embodiment of a first plate.

The first plate 281 is a conductive plate contacting both the cap 216 and the second plate 271. The first plate 281 includes a main body 282 having an approximately circular shape. A center portion 285 of the first plate 281 (e.g., a portion of the first plate 281 corresponding to the center axis C) makes contact with the center portion 275 of the second plate 271. A portion of the first plate 281 outside the center portion 285 is spaced apart from the second plate 271.

The center portion 285 of the first plate 281 protrudes toward the second plate 271 and has an approximately circular shape having a radius r2 based on the center axis C. The radius r2 of the center portion 285 of the first plate 281 is greater than the radius r4 of the center portion 275 of the second plate 271. The radius r2 of the center portion 285 of the first plate 281 may be sufficiently large to allow the center portion 285 to cover the holes 273 of the second plate 271.

The center portion 285 of the first plate 281 may be electrically connected to the center portion 275 of the second plate 271, for example, through a welding process. The first electrode tab 170 may be electrically connected to a lower surface of the second plate 271 through a welding process.

In the present embodiment, the center portion 285 of the first plate 281 and the center portion 275 of the second plate 271 are in contact with each other. In one embodiment, the first plate 281 and the second plate 271 may be in contact with each other in a region away from the center axis C.

The first plate 281 may include a contact bead 287 protruding toward the cap 216. The contact bead 287 may have, for example, a circular ring shape with a radius r3 based on the center axis C. The contact bead 287 of the first plate 281 makes contact with an inner surface (or a lower surface) of the cap 216. The radius r3 of the contact bead 287 is greater than the radius r2 of the center portion 285. In addition, the radius r3 of the contact bead 287 may be greater than the radius r1 of the groove 218 in the cap 216. In this case, even though the radius r1 of the groove 218 in the cap 216 is less than the radius r3 of the contact bead 287, the radius r1 of the groove 218 may be greater than the radius r2 of the center portion 285.

The contact bead 287 maintains electric connection between the first plate 281 and the cap 216. When the first plate 281 is deformed because of an increase in the internal pressure of the secondary battery 10, the contact bead 287 may protect against deformation impact. Thus, deformation impact may not be transmitted to an edge portion of the cap assembly 270.

The first plate 281 may further include an edge portion 289 of the first plate 281 extending radially outward from the contact bead 287. The edge portion 289 of the first plate 281 may be surrounded by the insulator 276. In addition, the edge portion 289 of the first plate 281 coupled to the insulator 276 is surrounded by the cap circumference portion 219.

The insulator 276 may have, for example, a circular ring shape and may have a U-shaped cross-section. Thus, insulator 276 may surround upper, lower, and lateral sides of the edge portion 289 of the first plate 281. The insulator 276 extends radially on a lower surface of the edge portion 289 of the first plate 281 between the edge portion 289 of the first plate 281 and an edge portion of the second plate 271.

A portion of the first plate 281 outside the center portion 285 is spaced apart from the second plate 271 by the insulator 276. In addition, because of to the insulator 276, the first plate 281 may be fixed to the cap circumference portion 219 in a state in which portions of the first plate 281, other than the contact bead 287, are spaced apart from the cap 216.

The current interrupt device fractures along the groove 274 at a preset operation pressure. Then, the first plate 281 may be deformed while the center portion 285 of the first plate 281 is pushed upward toward the cap 216. At this time, impact caused by deformation of the first plate 281 is not transmitted to an edge region because of the contact bead 287. Because the current interrupt device operates at the preset operation pressure as described above, the first electrode 113 is electrically disconnected from the cap 216.

The cap 216 fractures along the groove 218 at a preset fracture pressure, and then gas may be discharged to the outside of the cap 216. The preset fracture pressure may be higher than the preset operation pressure. For example, the preset operation pressure may be in the range of about 8 kg/cm$^2$ to about 15 kg/cm$^2$. For example, the preset fracture pressure may be within the range of about 20 kg/cm$^2$ to about 30 kg/cm$^2$. In one embodiment, the operation pressure and the fracture pressure may be varied, for example, according to design requirements.

The gasket 260 provides sealing between the opening of the case 200 and the cap assembly 270. The gasket 260 surrounds the cap assembly 270. A portion of the case 200 located from the opening to the bead 210 surrounds the gasket 260. The clamping portion 211 pushes the gasket 260 against the cap assembly 270. The gasket 260 includes an insulative, elastic material. For example, the gasket 260 includes a polymer, e.g., poly butyl terephthalate (PBT) and poly propylene (PP).

Figure 8:
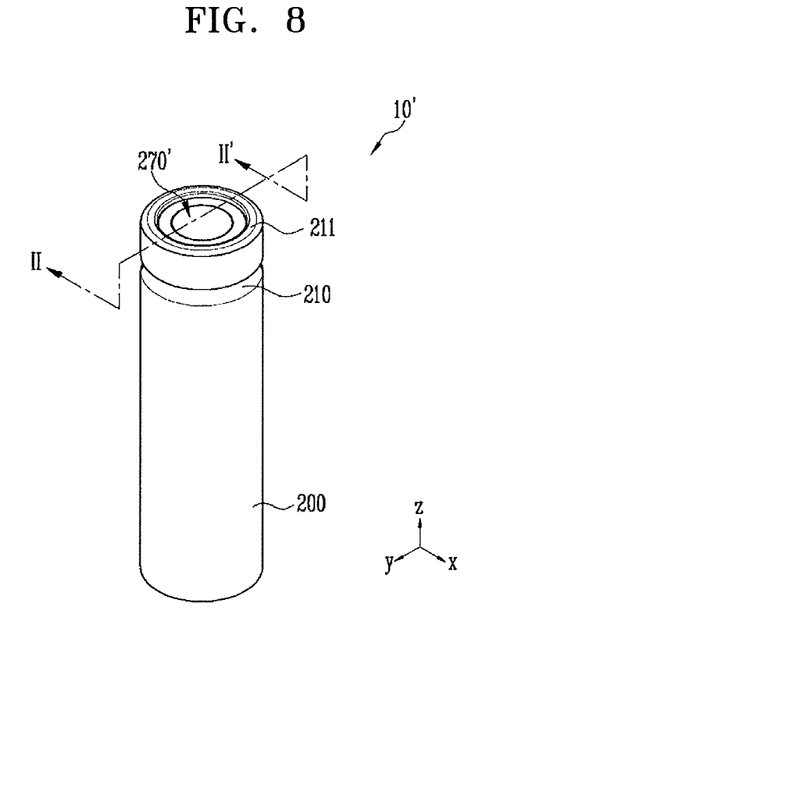
FIG. 8 illustrates an other embodiment of a secondary battery.
Figure 9:
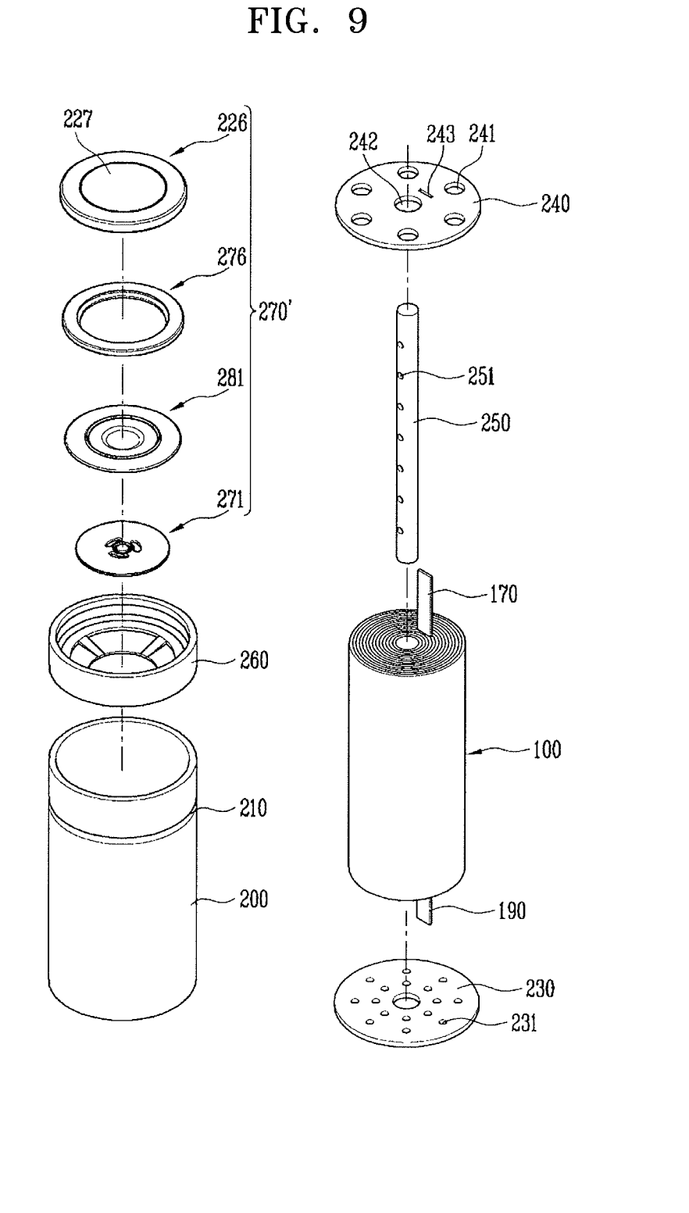
FIG. 9 illustrates another view of the secondary battery in FIG. 8.
Figure 10:
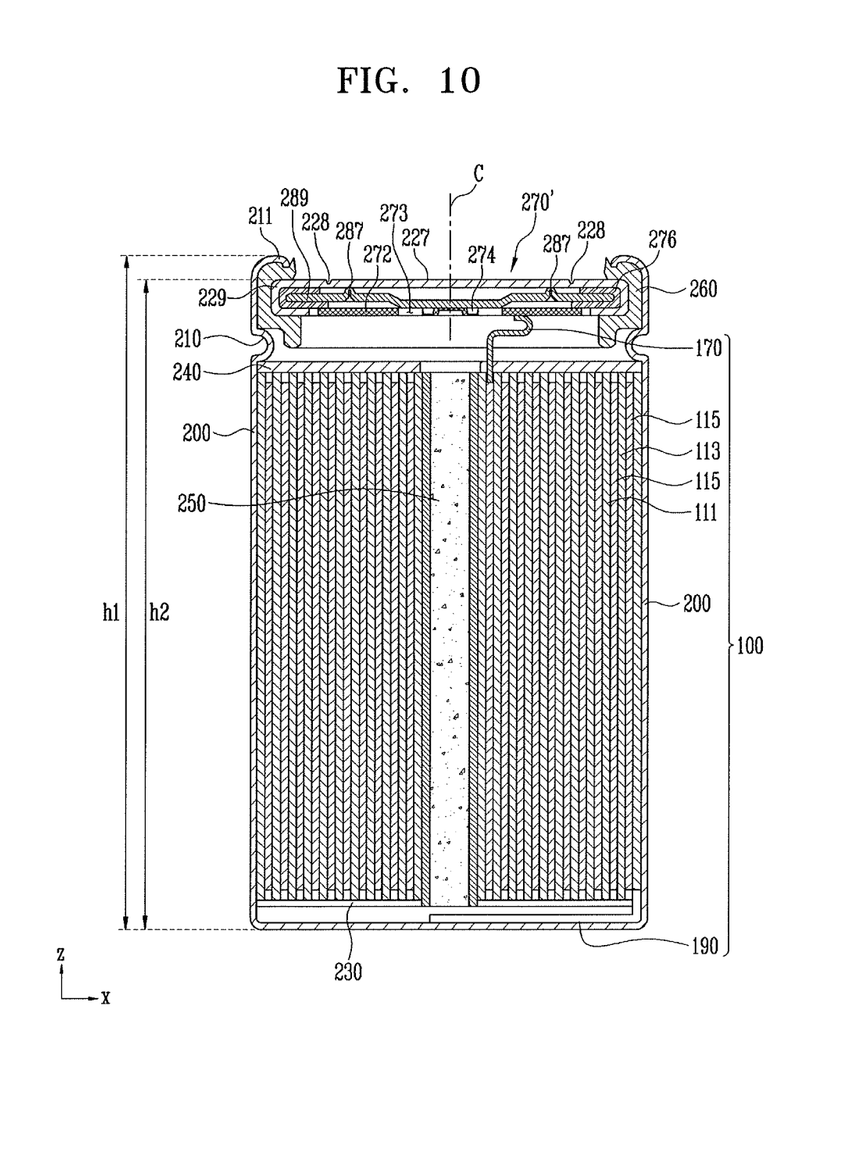
FIG. 10 illustrates a view along section line II-II' in FIG. 8.

FIG. 8 illustrates another embodiment of a secondary battery 10'. FIG. 9 is an exploded perspective view illustrating the secondary battery 10'. FIG. 10 is a cross-sectional view taken along line II-II' in FIG. 8.

Referring to FIGS. 8, 9, and 10, the secondary battery 10' includes an electrode assembly 100, a plurality of insulation plate 230 and 240, a center pin 250, a case 200 accommodating the electrode assembly 100, a cap assembly 270' coupled to an opening of the case 200, and a gasket 260 sealing the opening of the case 200 together with the cap assembly 270'.

The secondary battery 10' includes the cap assembly 270', which includes a cap 226 functioning as an electrode terminal and a current interrupt device between the cap 226 and the electrode assembly 100. The current interrupt device includes a first plate 281, a second plate 271, and an insulator 276. The current interrupt device may have the same structure as the current interrupt device of the embodiment of FIG. 1.

The cap 226 is electrically connected to a first electrode 113 of the electrode assembly 100 via the current interrupt device. The current interrupt device breaks electric connection between the cap 226 and the first electrode 113 at a preset operation pressure as described above. The cap 226 functions as a terminal of the first electrode 113 of the electrode assembly 100. The cap 226 may have, for example, a cylindrical barrel shape with an opening toward the electrode assembly 100, and may have a space for accommodating the current interrupt device. The cap 226 covers an upper portion of the current interrupt device and surrounds an edge portion of the current interrupt device.

Figure 11:
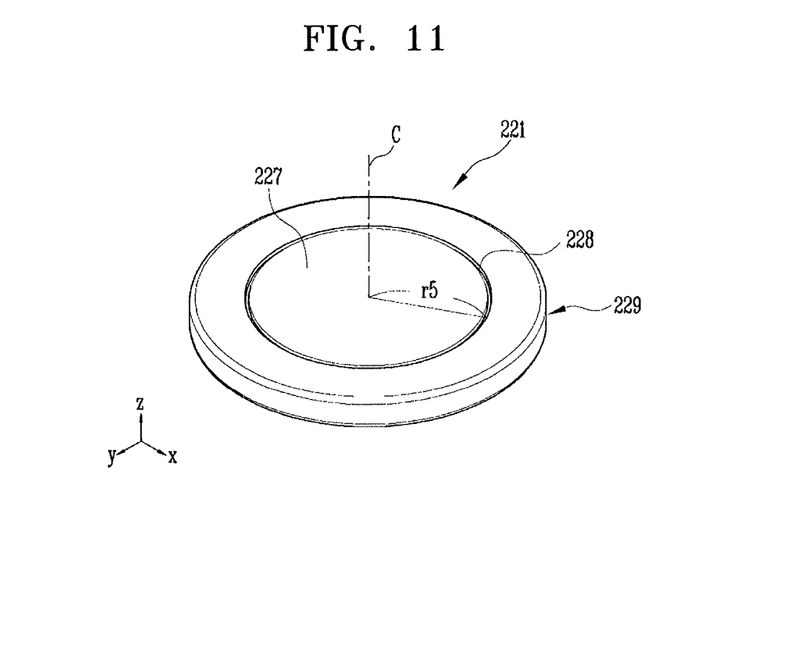
FIG. 11 illustrates another embodiment of a cap.

The cap 226 includes a conductive material, e.g., aluminum or another material. The cap 226 includes a terminal surface 227 extending in radial directions outward from a center axis C of the secondary battery 10'. A cap circumference portion 229 extends from the terminal surface 227 and surrounds the edge portion of the current interrupt device. The cap circumference portion 229 is bent, for example, in an approximately U-shape and surrounds an outer edge portion of the current interrupt device.

The terminal surface 227 extends to the outside of the case 200 and functions as a terminal of the first electrode 113. A groove 228 at which the thickness of the cap 226 is relatively small is formed in the terminal surface 227. The cap 226 fractures along the groove 228 at a preset fracture pressure. The groove 228 may have, for example, a circular ring shape with a radius r5.

Figure 12:
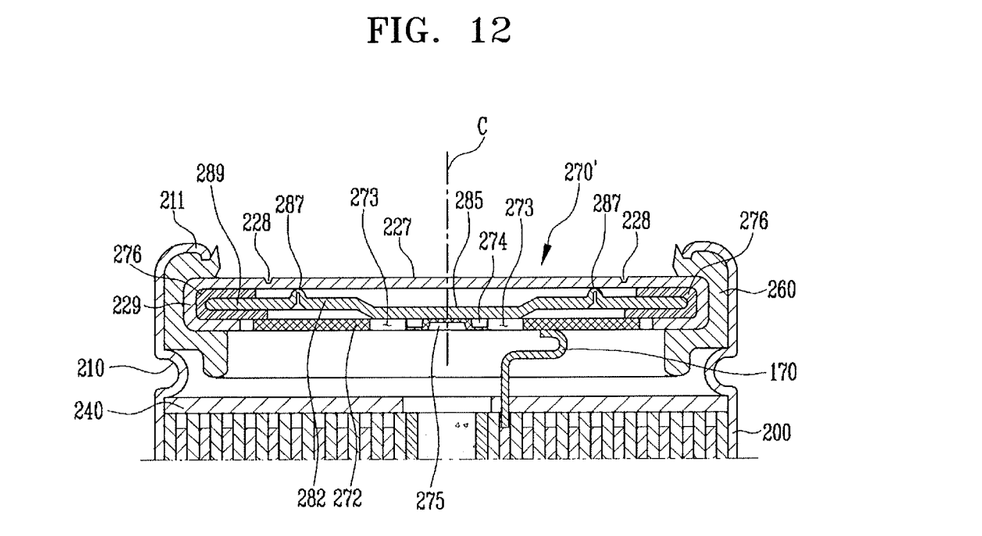
FIG. 12 illustrates an enlarged view of a portion of FIG. 10.

In the present embodiment, the radius r5 of the groove 228 of the cap 226 is greater than a radius r3 of a contact bead 287 of the first plate 281. In addition, the radius r5 of the groove 228 of the cap 226 is less than inner radius of an upper surface of the insulator 276. For example, the groove 228 may be inside the insulator 276 in a radial direction, and the radius r5 of the groove 228 may be greater than the radius r3 of the contact bead 287.

A portion of the terminal surface 227 surrounded by the groove 228 may be flat. For example, the terminal surface 227 of the cap 226 may not protrude but may be flat and level with the cap circumference portion 229 of the cap 226. In this case, a second height h2 may be less than the second height h2 in the previous embodiment.

In accordance with one or more of the aforementioned embodiments, the height of a cap determining a second height h2 may be varied in a range not exceeding the height of a clamping portion 211. The cap may function as a terminal of the secondary battery and surrounds the current interrupt device. Thus, the secondary battery may have a compact structure.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:
1. A secondary battery, comprising:
an electrode assembly that includes a separator between a first electrode and a second electrode;
a cap assembly electrically connected to the first electrode; and
a case accommodating the electrode assembly and including an opening to which the cap assembly is coupled, wherein the cap assembly includes:
a cap outside the case and serving as a terminal of the first electrode; and
a current interruptor between the cap and the first electrode, the current interruptor to break an electric connection between the cap and the first electrode at a preset pressure or higher, wherein an edge of the cap extends along a top of the current interruptor and surrounds an edge portion of the current interruptor to have a bottom portion partially along a bottom of the current interruptor, wherein the current interruptor includes:
a first plate contacting the cap, and
a second plate contacting the first plate, centers of the first plate, the second plate, and the cap overlapping each other in a vertical direction, and the center of the first plate being between the centers of the cap and of the second plate in the vertical direction, and wherein the bottom portion of the cap that extends partially along the bottom of the current interrupter is along and in parallel to a bottom surface of the first plate, the bottom portion of the cap having a bottom surface coplanar with a bottom surface of the second plate.

2. The secondary battery as claimed in claim 1, wherein:
the case includes a clamping portion bent toward the cap assembly, and
the cap has a height equal to or less than a height of the clamping portion.

3. The secondary battery as claimed in claim 1, wherein the cap has a reduced thickness to allow the cap to fracture at a preset pressure or higher.

4. The secondary battery as claimed in claim 3, wherein:
an exposed surface of the cap includes a groove with a circular ring shape, and the thickness of the cap is reduced in a region including the groove.

5. The secondary battery as claimed in claim 1,
wherein the first electrode of the electrode assembly is electrically connected to the cap via the second plate, and wherein the first plate is separated from the second plate at the preset pressure or greater.

6. A secondary battery, comprising:
an electrode assembly that includes a separator between a first electrode and a second electrode;
a cap assembly electrically connected to the first electrode; and
a case accommodating the electrode assembly and including an opening to which the cap assembly is coupled, wherein the cap assembly includes:
a cap exposed outside the case; and
a first plate contacting the cap, wherein the first plate is to deform at a preset pressure or greater to break an electric connection between the cap and the first electrode of the electrode assembly, and wherein an edge of the cap extends along a top of the first plate and surrounds an edge portion of the first plate to extend partially along a bottom of the first plate,
wherein the first plate includes a bead protruding toward the cap and contacting the cap, a portion of the first plate extending from the bead toward the edge portion of the first plate being parallel to a bottom of the case, and wherein an insulator is positioned between the top of the first plate and the edge of the cap, the insulator having a same thickness as the bead.

7. The secondary battery as claimed in claim 6, wherein the cap includes:
a protrusion; and
a circumference portion extending radially outward from the protrusion and having a height less than a height of the protrusion, wherein the bead is in contact with the circumference portion.

8. The secondary battery as claimed in claim 7, wherein:
the case includes a clamping portion bent toward the cap assembly, and
the height of the protrusion of the cap is equal to or less than a height of the clamping portion.

9. The secondary battery as claimed in claim 7, wherein the cap includes a groove between the protrusion and the circumference portion.

10. The secondary battery as claimed in claim 6, wherein the cap includes:
a flat exposed surface; and
a groove in the flat exposed surface of the cap.

11. The secondary battery as claimed in claim 6, wherein:
the cap assembly includes a second plate between the first plate and the first electrode of the electrode assembly, and
the first plate partially protrudes toward the second plate and contacts the second plate, the first plate to deform and separate from the second plate at the preset pressure or greater.

12. The secondary battery as claimed in claim 11, wherein:
the insulator extends between the first plate and the second plate, and
at least an edge portion of the second plate is spaced from the first plate.

13. The secondary battery as claimed in claim 11, wherein the cap is spaced from the second plate.

14. The secondary battery as claimed in claim 1, wherein the current interruptor includes a bead protruding from the top of the current interruptor and contacting the cap, a portion of the current interruptor extending from the bead toward the edge portion of the current interruptor being parallel to a bottom of the case.

15. The secondary battery as claimed in claim 14, further comprising an insulator between the top of the current interruptor and the edge of the cap, the insulator being on the portion of the current interruptor extending from the bead toward the edge portion of the current interrupter and having a same thickness as the bead.

16. The secondary battery as claimed in claim 1, wherein the edge of the cap has a horizontal U-shape in a side cross-sectional view.

17. The secondary battery as claimed in claim 5, wherein the first plate includes a bead protruding from the first plate and contacting the cap, a portion of the first plate extending from the bead toward an edge of the first plate being flat and parallel to a bottom of the case.

* * * * *